June 17, 1969  R. H. WEICHSEL  3,450,448

GAS BEARINGS

Filed Feb. 15, 1967

Inventor
RICHARD H. WEICHSEL
By John Mahoney
Attorney

United States Patent Office 3,450,448
Patented June 17, 1969

3,450,448
GAS BEARINGS
Richard H. Weichsel, Hudson, Ohio, assignor to The Apex Bearings Company, a corporation of Ohio
Filed Feb. 15, 1967, Ser. No. 623,490
Int. Cl. F16c 1/24, 33/66, 13/02
U.S. Cl. 308—122                              6 Claims

ABSTRACT OF THE DISCLOSURE

An outer circular housing has ribs at its opposite ends which engage a porous sleeve. The sleeve surrounds a shaft which is rotatable with close tolerance within the sleeve. The housing has a straight groove extending between its ribs from which circular or helically segmental grooves extend. The porous sleeve is formed of small spherically-shaped copper particles encapsulated with sintered tin in the form of venturi-shaped pores and means are provided to pass a gas through the outer housing into the straight groove and from the straight groove into the circular or helical segmental grooves and thence through the porous sleeve. The venturi-shaped pores restrict the flow of gas through the sleeve which gas then expands and forms a thin uniform film in proximity to the inner wall of the sleeve. To prevent linear motion of the shaft, the porous sleeve may be extended beyond one of the peripheral ribs of the housing and a disc formed of the same material as the sleeve extends radially therefrom and the housing is provided with a flanged portion arranged adjacent the disc having circular grooves therein separated by a circular land. A socket in the flanged portion of the housing is provided through which a gas may be introduced into the circular grooves. The thickness of the sleeve and disc should be that required to support the static load at the working surface and the width of the lands and grooves in both cases is approximately the same as the thickness of the sleeve and disc, respectively. The depth of the grooves in both cases is approximately one-half of the thickness of the sleeve or disc associated therewith.

---

The present invention relates to bearings and more particularly to gas bearings, such as air, engine exhaust gases, or the like, interposed between a porous stationary sleeve and a shaft rotatable within the sleeve. It also relates to a gaseous thrust bearing arranged between a shaft and a stationary bearing for preventing endwise movement of the shaft and to the combination of such a thrust bearing and a gaseous bearing within which a shaft is rotatable.

To prevent vibration in a compressed gas bearing, there must be a limited amount of gas in combination with the lubricating gas film. In other words, there must be a restriction between the lubricating gas film and a compressed gas source to isolate the gas supply from the film to a sufficient extent to dampen vibrations. The restriction, however, must not be sufficient to prevent the flow of the gas to the film to provide pressure upon the film.

To provide gas bearing systems, it has heretofore been proposed to utilize a bearing having multiple holes leading to the gas film. In such bearings, the restriction varies with the thickness of the film and it is difficult to obtain a substantially uniform load supporting film. It has also been proposed to use mechanically-formed porous type bearings through which a gas may be passed to provide a gas film. In bearings of the porous type, gas restriction occurs ahead of the port of entry of the gas to the film. Restriction therefore does not vary with the thickness of the film as in the case of the multiple hole type bearing and consequently the bearing can be more easily loaded than with multiple hole feed bearings. In mechanically formed porous type bearings as previously provided, however, considerable turbulence occurs and it is difficult to provide a thin, substantially uniform gas bearing for a rotatable shaft.

In accordance with the present invention, an improved gas bearing is provided in which a thin, substantially uniform, nonturbulent gas film may be provided between a bearing and a rotatable member, such as a shaft. It also relates to a gaseous thrust bearing for preventing endwise movement of a rotatable shaft and to a gaseous bearing in which a shaft is rotatable in either direction in combination with a gas thrust bearing for preventing endwise movement of the rotatable shaft.

It is therefore an object of the present invention to provide an improved gas bearing for a shaft which is rotative in opposite direction within the bearing.

Another object of the invention is to provide a main bearing in which a shaft is rotatable in opposite directions within a bearing and in which a gaseous thrust bearing is provided for preventing endwise movement of the shaft.

A further object of the invention is to provide an improved structure including a shaft which is rotatable in opposite directions within a main gas bearing in combination with a thrust bearing for preventing endwise movement of the shaft.

My invention will be better understood by reference to the accompanying drawing in which.

Figure 1:
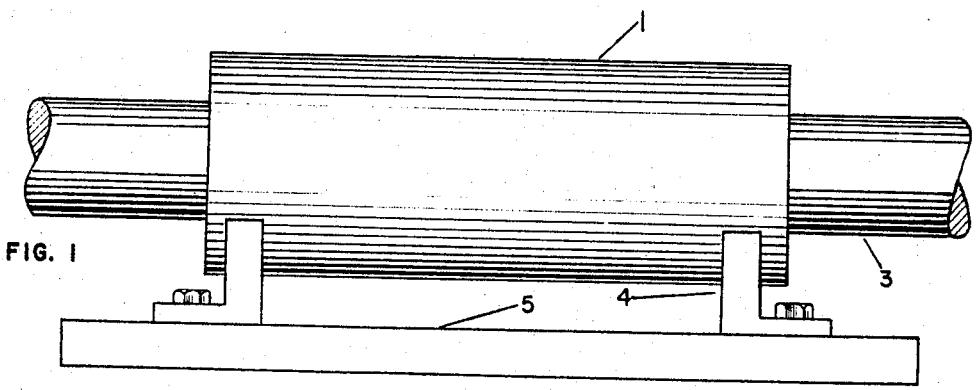
FIG. 1 is an elevational view of a stationary gas bearing for a shaft which shaft may be rotated in opposite directions within the bearing.

As illustrated in the drawings, the bearing of the present invention consists of an outer housing and an inner porous sleeve 2 which surrounds a rotatable shaft 3. The outer housing may be supported in any convenient manner. As illustrated, supports 4 in the form of saddles are provided at each end which supports have flanges extending laterally therefrom which may be bolted or otherwise secured to a base plate 5.

The porous sleeve may be formed of any suitable material affording sufficient feed therethrough to provide and sustain a substantially uniform film between the sleevs and the shaft 3. It is preferably composed of a commercially available material, such as "Oilite" which consists of a body composed of small copper spheres of approximately 100 mesh and of substantially uniform size which are encapsulated with sintered tin particles. In preparing the sleeve, copper particles of substantially 100 mesh and tin particles of substantially 200 mesh, both of which are substantially spherical in shape, are pressed into a unitary structure and sufficient heat is applied to sinter the tin. A temperature of approximately 1535° Fahrenheit may be used. The temperature, however, should not be sufficient to liquefy the copper. The copper therefore retains its spherical shape and is encapsulated with sintered tin particles to provide myriads of venturi-shaped pores in which pores gas passing through the sleeve meets its maximum restriction which is evident by a substantial pressure drop. After the gas passes outwardly through the venturi-shaped pores in the sleeve, it expands to form a thin, nonturbulent film which lies in close proximity to the inside diameter of the sleeve.

In sleeve 2, the small copper spheres preferably constitute the major proportion of the sleeve and while I do not desire to be limited to any particular proportions, the copper spheres may be present in an amount ranging from approximately 60% to 90% and the tin in proportions ranging from approximately 10% to 40%. For example, a sleeve may be composed of approximately 90% copper spheres and 10% of sintered tin.

Figure 2:
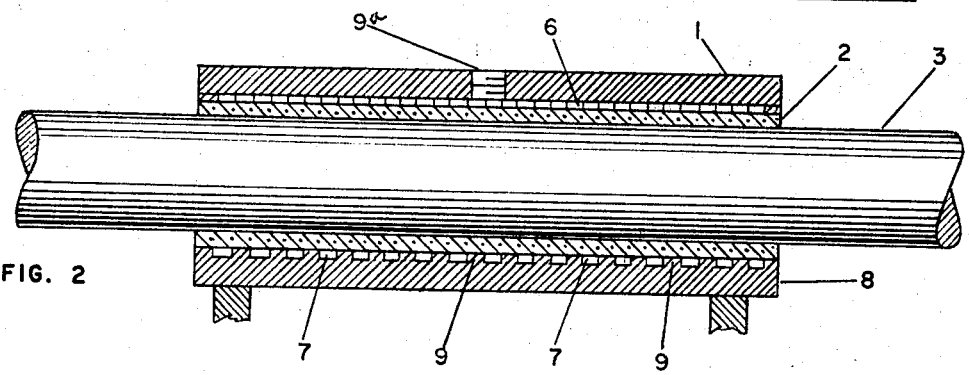
FIG. 2 is a cross sectional view of the bearing shown in FIG. 1.

In preparing the composite bearing, a sleeve which is formed of a gas permeable material may be selected which has the proper inside diameter to receive the shaft 3 with a comparatively close tolerance, such as approximately .001 of an inch and the outer housing may be formed of a metal that may be machined, such as steel, aluminum, or bronze. The outer housing is then provided with a substantially straight groove 6 as shown in FIG. 2 from which substantially circular grooves extend, or if desired, a helical groove may be formed in the housing which is intercepted at intervals by the straight groove 6. The groove or grooves are then deburred.

The outside diameter of the sleeve and the inside diameter of the housing should be substantially equal although each may vary from approximately minus .00025 on the inside diameter of the outer and plus .00025 on the outside diameter of the inner from its nominal diameter. In such case, the sleeve may be cooled to a temperature of approximately 0° Fahrenheit and the housing may be heated to a temperature of approximately 250° Fahrenheit. The outer housing which has peripheral flanges or lands 8 at its opposite ends is then slipped over the porous sleeve and the assembly is allowed to attain room temperature. The composite bearing may then be mounted upon a mandrel and the outer housing turned to provide the desired outside diameter.

To properly supply the porous metal sleeve with a sufficient amount of gas, the construction should be of a nature to allow the pressure to be uniform at the working surface. To obtain this uniform head, the normal linear wall thickness of the sleeve should be in keeping with that which is required to support the static or at rest load at the working surface. Having thus established the lateral wall thickness of the sleeve, this linear measurement should constitute the width of both the channels or grooves 7 and the peripheral ribs 8 at the ends of the housing and the lands 9 between the grooves. In such case, the depth of the grooves 9 is approximately one-half of the width of the groove. With such an arrangement, a gas, such as air, flowing from a conduit means connected to a tapped opening 9a into the straight groove 6 had the circular grooves 7 are first restricted by the venturi-shaped orifices in the sleeve and then expands to form a thin, nonturbulent film between the sleeve and the shaft 3.

Figure 3:
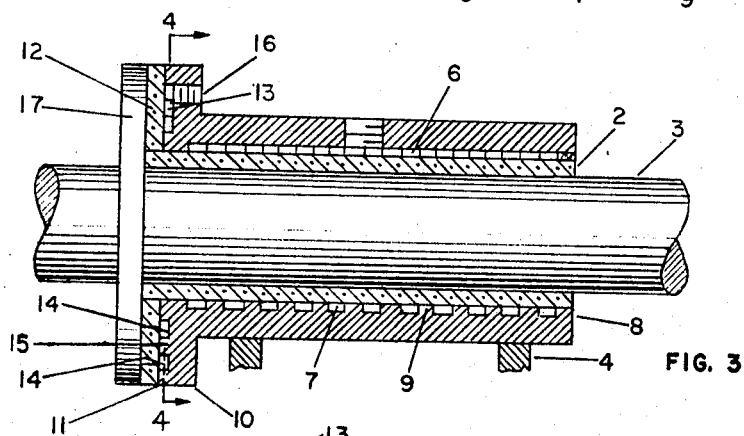
FIG. 3 is a cross sectional view of a bearing similar to that shown in FIG. 2 in combination with a gaseous thrust bearing for preventing endwise movement of the rotatable shaft.
Figure 4:
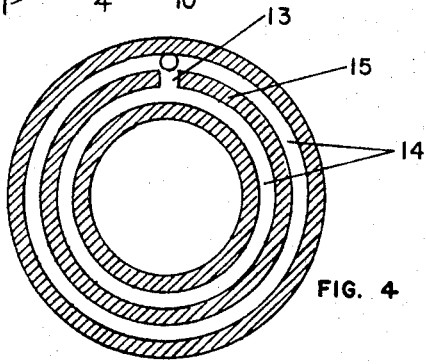
FIG. 4 is a cross sectional view taken on a plane passing through the line 4—4 of FIG. 3 looking in the direction of the arrows.

Another form of my invention is shown in FIGS. 3 and 4 in which the porous sleeve 2 and the cylindrical shaft 3 are the same as shown in FIGS. 1 and 2. In the modification shown in FIGS. 3 and 4, the porous sleeve 2 is formed of the same metal and is similar to that shown in FIGS. 1 and 2 with the exception that one portion of the porous sleeve extends beyond the outer housing and the adjacent end of the outer housing is flanged at 10 and terminates in a peripheral flange or rib 11 which engages the outer periphery of a porous disc 12 which may be formed of the same material as the porous sleeve 2. The flange 10 is provided with a straight groove 13 from which circular groove 14 extend which are separated from each other by a substantially circular land 15 which groove and lands are of substantially the same thickness as the rib 11 and disc 12. The depth of grooves 14, however, are approximately one-half of the thickness of disc 12.

In operation, a gas, such as air, is introduced through a socket 16 into the straight groove 13 and passes through circular grooves 14 into contact with the porous disc 12 in which the gas is first restricted as it passes through the venturi-shaped pores in the disc and then expands to form a thin gas bearing between disc 12 and a flange 17 on the shaft 3 to provide a thrust bearing when flange 17 is moved into close tolerance with disc 12. In the thrust bearing, the distribution of the gas over a plurality of areas on the inside of disc 12 and which pass through the disc provides a thin film having a comparatively high load capacity and the provision of restriction ahead of the gas film provides a film that does not vary with its thickness and provides a stiffness factor which permits an accurate bearing to be obtained. It will also be noted that only a small portion of the gas passes through the outer peripheral portion of the porous disc 12 and the flange 17 and because of the restriction while passing through the porous disc 12, there is an economy in the amount of gas necessary to provide the bearing.

What I claim is:

1. The combination of a thrust bearing and a cylindrical shaft movable linearly within the thrust bearing and having a flange extending radially therefrom, said bearing including a porous disc, an annular metal housing having an annular peripheral portion engaging the periphery of said disc and a straight groove from which a plurality of annular grooves extend, a circular land upon the housing interposed between and separating said circular grooves from each other, and means for passing a gas into the straight groove in said housing from whence it flows through the substantially circular grooves into contact with and through the porous disc to form a thin gas bearing between the porous disc and the annular flange on said shaft when said flange is in a position to prevent linear movement of said shaft.

2. The combination of a bearing and a shaft which is rotatable within the bearing and is provided with a peripheral flange, said bearing having an inner porous sleeve surrounding and in sufficiently close tolerance with said shaft to provide a thin gas bearing and an outer annular metallic housing having a peripheral flange at one end which engages one of the outer end portions of said sleeve and a peripheral flange at its opposite end portion which is spaced inwardly from the other end of the porous sleeve, said housing being provided with a substantially straight groove and a plurality of substantially circular grooves which are intercepted by the straight groove, lands on the outer housing for separating said grooves from each other, means whereby a gas may be passed into the substantially straight groove in the outer housing from whence it flows through the annular grooves in the housing into contact with and through the porous sleeve and forms an annular gas bearing between the inner sleeve and the shaft during rotatable movement of the shaft, a porous disc extending radially outwardly from that portion of the inner porous sleeve which extends beyond the outer housing and said outer housing having a flanged portion extending radially outwardly from one of its ends and having a peripheral land thereon which engages the periphery of said disc to form a second housing, and said radially extending flanged portion of the second outer housing having a substantially straight groove therein and a plurality of circular grooves extending therefrom, an annular land on said second housing for separating said grooves in the second housing from each other, and means whereby a gas may be passed into the straight groove in the flanged portion of the second housing from which it passes through the grooves in the flanged portion of the second housing and thence through the porous disc to form an air thrust bearing between the flange on said shaft and said porous disc when the shaft is moved in a linear direction to force said flange on the shaft into close tolerance with said disc.

3. A bearing including a rotatable shaft, a porous sleeve surrounding said shaft and having its inner surface in close tolerance therewith, a stationary housing surrounding said shaft and having portions engaging said sleeve, a porous disc extending radially outwardly relative to said shaft in proximity to one end of said housing, said shaft having a flange extending radially therefrom and being movable therewith which flange engages said porous disc to limit linear movement of said shaft in one direction, and means for passing a gas through said housing and through said porous sleeve and said porous disc to form a gas bearing for the rotatable shaft and a gaseous thrust bearing for said flange.

4. A bearing as defined in claim 3 in which the shaft is movable linearly in one direction to remove the flange from said porous disc and inwardly into engagement with said porous disc to limit the movement of said shaft in the opposite direction.

5. A bearing as defined in claim 3 in which the portions of said stationary housing which engages said porous sleeve are arranged at the opposite end portions of said sleeve and in which one end portion of said porous sleeve extends outwardly beyond said housing and forms a support for the inner portion of said disc and said housing having a flanged portion, the outer periphery of which engages and forms a support for the outer portion of said disc and in which the means for passing gas into the housing for said porous disc is separate from the means for passing gas through the housing surrounding said sleeve.

6. A bearing as defined in claim 5 in which the flanged portion of said housing has inner and outer peripheral ribs for engaging said porous disc and a circular land is arranged between the ribs to form grooves through which a gas is passed into engagement with the inner portion of said porous disc and flows therethrough to form a thin nonturbulent film of gas between said disc and the flange extending from said shaft to form a thrust bearing for limiting the movement of said shaft in one direction when the flange on said shaft is moved into engagement with said disc.

References Cited

UNITED STATES PATENTS

| | | | |
|---|---|---|---|
| 2,696,410 | 12/1954 | Topanelian | 308—9 |
| 3,103,364 | 9/1963 | Macks et al. | 274—39 |
| 3,352,607 | 11/1967 | Boyd | 308—9 |
| 2,187,307 | 1/1940 | Friend | 308—108 |
| 3,374,039 | 3/1968 | Voorhies | 308—122 X |

CARROLL B. DORITY, Jr., *Primary Examiner.*

U.S. Cl. X.R.

308—170